(12) United States Patent
Watanabe et al.

(10) Patent No.: US 9,789,819 B2
(45) Date of Patent: Oct. 17, 2017

(54) DRIVING ASSISTANCE DEVICE (71) Applicant: HONDA MOTOR CO., LTD., Minato-Ku, Tokyo (JP)

(72) Inventors: Takashi Watanabe, Shioya-gun (JP); Kei Oshida, Utsunomiya (JP); Haruhiko Nishiguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 14/417,668

(22) PCT Filed: May 21, 2013

(86) PCT No.: PCT/JP2013/064045
§ 371 (c)(1),
(2) Date: Jan. 27, 2015

(87) PCT Pub. No.: WO2014/027489
PCT Pub. Date: Feb. 20, 2014

(65) Prior Publication Data
US 2015/0203033 A1  Jul. 23, 2015

(30) Foreign Application Priority Data
Aug. 17, 2012  (JP) ................................ 2012-181060
Aug. 17, 2012  (JP) ................................ 2012-181062

(51) Int. Cl.
*H04N 7/18*  (2006.01)
*H04N 7/00*  (2011.01)
(Continued)

(52) U.S. Cl.
CPC ................ *B60R 1/00* (2013.01); *B60R 11/04* (2013.01); *G01C 21/3697* (2013.01);
(Continued)

(58) Field of Classification Search
None
See application file for complete search history.

(56) References Cited

U.S. PATENT DOCUMENTS

2002/0003571 A1* 1/2002 Schofield ................ B60C 23/00
348/148
2002/0110262 A1* 8/2002 Iida .......................... B60R 1/00
382/104
(Continued)

FOREIGN PATENT DOCUMENTS

JP  2001206776 A  7/2001
JP  2001-260776 A  9/2001
(Continued)

OTHER PUBLICATIONS

Office Action mailed Jun. 6, 2016 corresponding to Chinese Patent Application 201380042527.4.
(Continued)

*Primary Examiner* — Talha M Nawaz
(74) *Attorney, Agent, or Firm* — Carrier Blackman & Associates, P.C.; Joseph P. Carrier; Jeffrey T. Gedeon (57) ABSTRACT

A driving assistance device includes: an image capturing part configured to image-capture a rear lateral area of a host vehicle and a dead angle area; a display part configured to display a video image captured by the image capturing part; and a blinker switch configured to make a signal of a movement of the host vehicle to a first side or a second side. The display part displays the video image according to a turn on of the blinker switch indicating a movement of the vehicle to the second side, turns off the display of the video image when a predetermined amount of time elapses after the blinker switch is turned off, and turns off the display of the video image before the predetermined amount of time
(Continued)

elapses when it is predicted that the host vehicle moves to the first side within the predetermined amount of time.

3 Claims, 10 Drawing Sheets

(51) Int. Cl.
    *B60R 1/00*         (2006.01)
    *G08G 1/16*         (2006.01)
    *G01C 21/36*       (2006.01)
    *B60R 11/04*       (2006.01)
    *G06K 9/00*         (2006.01)
    *G06K 9/20*         (2006.01)

(52) U.S. Cl.
    CPC ............... *G08G 1/166* (2013.01); *H04N 7/18* (2013.01); *B60R 2300/70* (2013.01); *G06K 9/00805* (2013.01); *G06K 9/2018* (2013.01)

(56) References Cited

U.S. PATENT DOCUMENTS

| | | | | |
|---|---|---|---|---|
| 2005/0064936 A1* | 3/2005 | Pryor | ................. | A63F 3/00643 463/36 |
| 2005/0134982 A1* | 6/2005 | Stonecypher | ........... | B60R 1/082 359/872 |
| 2006/0055525 A1* | 3/2006 | Kubota | ................ | G08G 1/0962 340/461 |
| 2008/0132332 A1* | 6/2008 | Pryor | ...................... | A63F 13/00 463/31 |
| 2009/0189373 A1* | 7/2009 | Schramm | ................ | B60K 35/00 280/731 |
| 2010/0321174 A1* | 12/2010 | Chen | ...................... | B60Q 9/008 340/435 |
| 2011/0133957 A1* | 6/2011 | Harbach | .................. | G08G 1/14 340/932.2 |
| 2012/0069187 A1* | 3/2012 | Ozaki | ....................... | B60R 1/00 348/148 |
| 2013/0135089 A1* | 5/2013 | Sejalon | ..................... | B60R 1/00 340/435 |

FOREIGN PATENT DOCUMENTS

| | | |
|---|---|---|
| JP | 2005-170286 A | 6/2005 |
| JP | 2007-112360 A | 5/2007 |
| JP | 2008-022125 A | 1/2008 |
| JP | 2010198428 A | 9/2010 |
| JP | 2011003117 A | 1/2011 |
| WO | 2006006689 A1 | 1/2006 |
| WO | 2010080610 A1 | 7/2010 |
| WO | 2010/137684 A1 | 12/2010 |

OTHER PUBLICATIONS

International Search Report of PCT/JP2013/064045 with a mailing date of Aug. 13, 2013.

* cited by examiner

DRIVING ASSISTANCE DEVICE

TECHNICAL FIELD

The present invention relates to a driving assistance device of a vehicle.

Priority is claimed on Japanese Patent Application No. 2012-181060 filed Aug. 17, 2012, and Japanese Patent Application No. 2012-181062 filed Aug. 17, 2012, the contents of which are incorporated herein by reference.

BACKGROUND ART

Recently, as a driving assistance device of a vehicle, a technique in which an external camera that image-captures a rear lateral area of the host vehicle and a monitor that displays an external video image captured by the external camera to be visually recognized are provided, and the external video image captured by the external camera is displayed on the monitor in accordance with the turn on of a blinker switch is known (for example, see Patent Document 1).

Further, Patent Document 1 discloses a configuration in which, when an off-operation of the blinker switch is performed, the external video image is continuously displayed for a predetermined amount of time after the off-operation of the blinker switch.

With this configuration, even when the blinker switch is turned off before right and left movement of the host vehicle (lane change, right or left turn, or the like) is completed, it is considered that the external video image can be continuously displayed on the monitor until the right and left movement of the host vehicle is completed.

Further, in the related art, a monitor for displaying an image of a variety of pieces of information is provided at a position inside the vehicle capable of being visually recognized by a driver. A path guide image from the navigation device, an external video image captured by an external camera that image-captures a rear lateral area of a vehicle, or the like is displayed on the monitor.

In addition, for example, Patent Document 2 discloses a configuration in which when an obstacle is detected in the rear lateral area of the vehicle, a warning image is displayed on the above-described monitor.

PRIOR ART DOCUMENTS

Patent Documents

Patent Document 1: Japanese Unexamined Patent Application, First Publication No. 2008-22125
Patent Document 2: Japanese Unexamined Patent Application, First Publication No. 2001-260776

SUMMARY OF THE INVENTION

Problems to be Solved by the Invention

For example, a map image or the like of the navigation device is displayed on the above-described monitor, and the map image is switched to an external video image according to turning on of the blinker switch.

However, in the above-described configuration of Patent Document 1, the external video image is displayed on the monitor until a predetermined amount of time elapses from the turning off of the blinker switch. Thus, for example, when the vehicle moves, immediately after moving to one side of left and right sides, to the other side thereof, it is not possible to confirm the map image or the like of the navigation device.

An aspect of the invention is made in consideration of the problems described above and an object thereof is to provide a driving assistance device capable of displaying an optimal image on a display part, for example, even when the vehicle executes, immediately after executing lane change or a right or left turn, another lane change or a right or left turn.

Further, a configuration in which, when displaying a warning image on the monitor, the warning image is overlapped with an image (for example, path guide image, external video image or the like) that is already displayed on the monitor may be considered.

However, for example, if the warning image is overlapped when the external video image is displayed, an obstacle captured on the external video image and the warning image are overlapped with each other on the monitor, which makes it difficult to confirm the obstacle through the monitor.

Another aspect of the invention is made in consideration of problems described above, and another object of the invention is to provide a driving assistance device capable of displaying a warning image in an optimal state according to an image that is already displayed on a display part.

Means for Solving the Problems

In order to achieve the above objects, a driving assistance device according to the invention employs the following configurations.

(1) A driving assistance device according to an aspect of the invention includes: an image capturing part that is provided, when it is assumed that a driver seat side in a vehicle width direction of a vehicle is a first side and a side opposite to the first side is a second side, on a side mirror on the second side of the vehicle, and is configured to image-capture a rear lateral area of the vehicle and a dead angle area which is adjacent to the rear lateral area outside a visual recognition range of the side mirror on the second side; a display part configured to display a video image captured by the image capturing part to be visually recognized by a driver of the vehicle; and a blinker switch configured to make a signal of a movement of the vehicle to the first side or the second side, in which the display part displays the video image according to a turn on of the blinker switch indicating a movement of the vehicle to the second side, turns off the display of the video image when a predetermined amount of time elapses after the blinker switch is turned off, and turns off the display of the video image before the predetermined amount of time elapses when it is predicted that the vehicle moves to the first side within the predetermined amount of time.

(2) In the aspect (1), the display part may turn off the display of the video image before the predetermined amount of time elapses when the blinker switch indicating the movement of the vehicle to the first side within the predetermined amount of time is turned on after the blinker switch indicating the movement of the vehicle to the second side is turned off.

(3) In the aspect (1) or (2), the display part may turn off the display of the video image before the predetermined amount of time elapses when it is predicted that the vehicle moves to the first side within the predetermined amount of time after the blinker switch indicating the movement of the vehicle to the second side is turned off, based on path guide information from a navigation device.

(4) In any one of the aspects (1) to (3), the display part may display a warning image for performing a warning to a driver when an obstacle is present in the vicinity of the vehicle, and when the video image is displayed on the display part, a warning image, which has a size smaller than a size of a warning image displayed when the video image is not displayed on the display part, is displayed in an overlapping manner with the video image.

(5) In the aspect (4), when the video image is not displayed on the display part, the warning image may be displayed at a position including a central part of a screen on the display part, and, when the video image is displayed on the display part, the warning image may be displayed at a position close to the vehicle on the video image displayed on the display part.

Advantage of the Invention

According to the aspect (1), even when the blinker switch is turned off before the movement of the vehicle to the first side or the second side (lane change, right or left turn, or the like) is completed, it is possible to continuously confirm the video image captured by the image capturing part until the movement of the vehicle to the first side or the second side is completed. Further, at a point of time when the blinker switch is turned off, when the movement of the vehicle to the first side or the second side is already completed, it is possible to confirm a movement of a following vehicle after the vehicle has moved to the first side or the second side through the display part.

Further, when it is predicted that the vehicle moves to the first side or the second side within the predetermined amount of time after the blinker switch is turned off, by turning off the display of the video image before the predetermined amount of time elapses, for example, it is possible to switch the image displayed by the display part to the navigation image or the like, to thus rapidly confirm the path guide.

Accordingly, it is possible to display an optimal image on the display part to enhance the convenience.

According to the aspect (2), it is possible to predict that the vehicle continuously moves to the first side within the predetermined amount of time after the movement to the second side, based on the turn on of the blinker switch indicating the movement of the vehicle to the first side.

Further, in this case, by turning off the display of the video image, for example, it is possible to switch the video image displayed by the display part to the navigation image or the like, to thus rapidly confirm the path guide.

According to the aspect (3), it is possible to predict that the vehicle continuously moves to the first side within the predetermined amount of time after the movement to the second side, based on the path guide information to the first side. Further, in this case, by turning off the display of the video image, for example, it is possible to switch the video image displayed by the display part to the navigation image or the like, to thus rapidly confirm the path guide.

According to the aspect (4), when the external video image is not displayed on the display part, a large warning image is displayed compared with a case where the external video image is displayed. Thus, a driver can reliably recognize the presence of an obstacle in the vicinity of the vehicle.

On the other hand, when the external video image is displayed on the display part, a small warning image is displayed compared with a case where the external video image is not displayed on the display part. Thus, the driver can recognize the presence of an obstacle in the vicinity of the vehicle while confirming the external video image.

Accordingly, it is possible to display the warning image in the optimal state according to the image displayed on the display part.

According to the aspect (5), when the external video image is not displayed, by displaying the warning image at the central part of the screen, it is possible to reliably notify the driver of the presence of an obstacle in the vicinity of the vehicle.

On the other hand, when the external video image is displayed, by displaying the warning image to be close to the vehicle in the external video image displayed on the display part, it is possible to prevent the central part (effective part) of the screen of the external video image displayed on the display part from being covered with the warning image. That is, since the warning image is displayed at such a position so as not to interfere when viewing the external video image, it is possible to notify the driver of the presence of an obstacle in the vicinity of the vehicle while securing visibility of the external video image. Thus, for example, when an obstacle is captured on the external video image, the warning image and the obstacle do not overlap each other on the display part, to thus make it possible to recognize the obstacle through the display part.

DESCRIPTION OF EMBODIMENTS

Hereinafter, in respective embodiments, as an example for description, it is assumed that a driver seat side in a vehicle width direction of a vehicle is a first side and a side (passenger side) opposite to the first side is a second side.

A first embodiment of the invention will be described with reference to the accompanying drawings.

(Driving Assistance Device)

Figure 1:
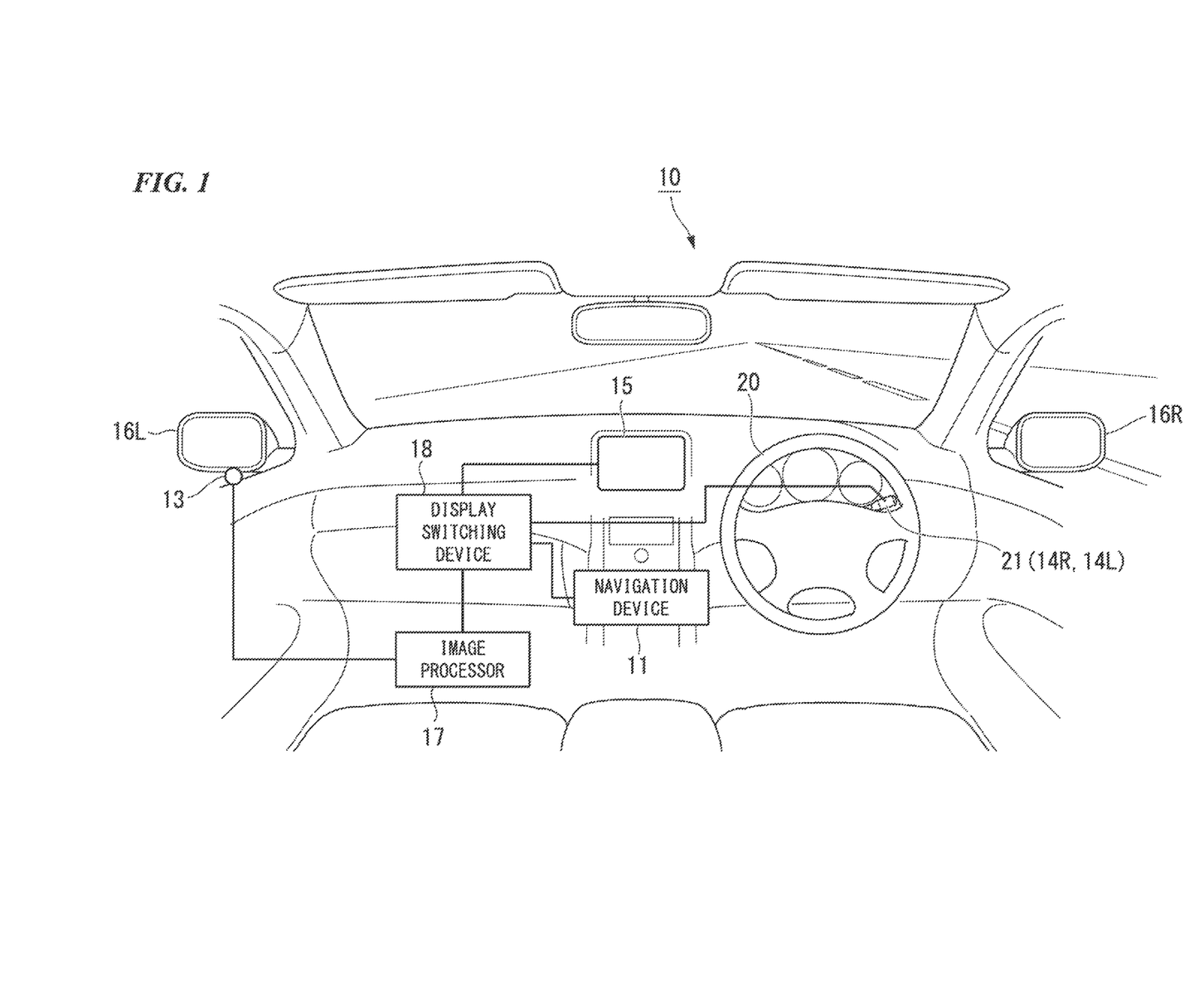
FIG. 1 is a configuration diagram showing a driving assistance device according to an embodiment of the invention, which is a front view seen from the interior of a vehicle.
Figure 2:
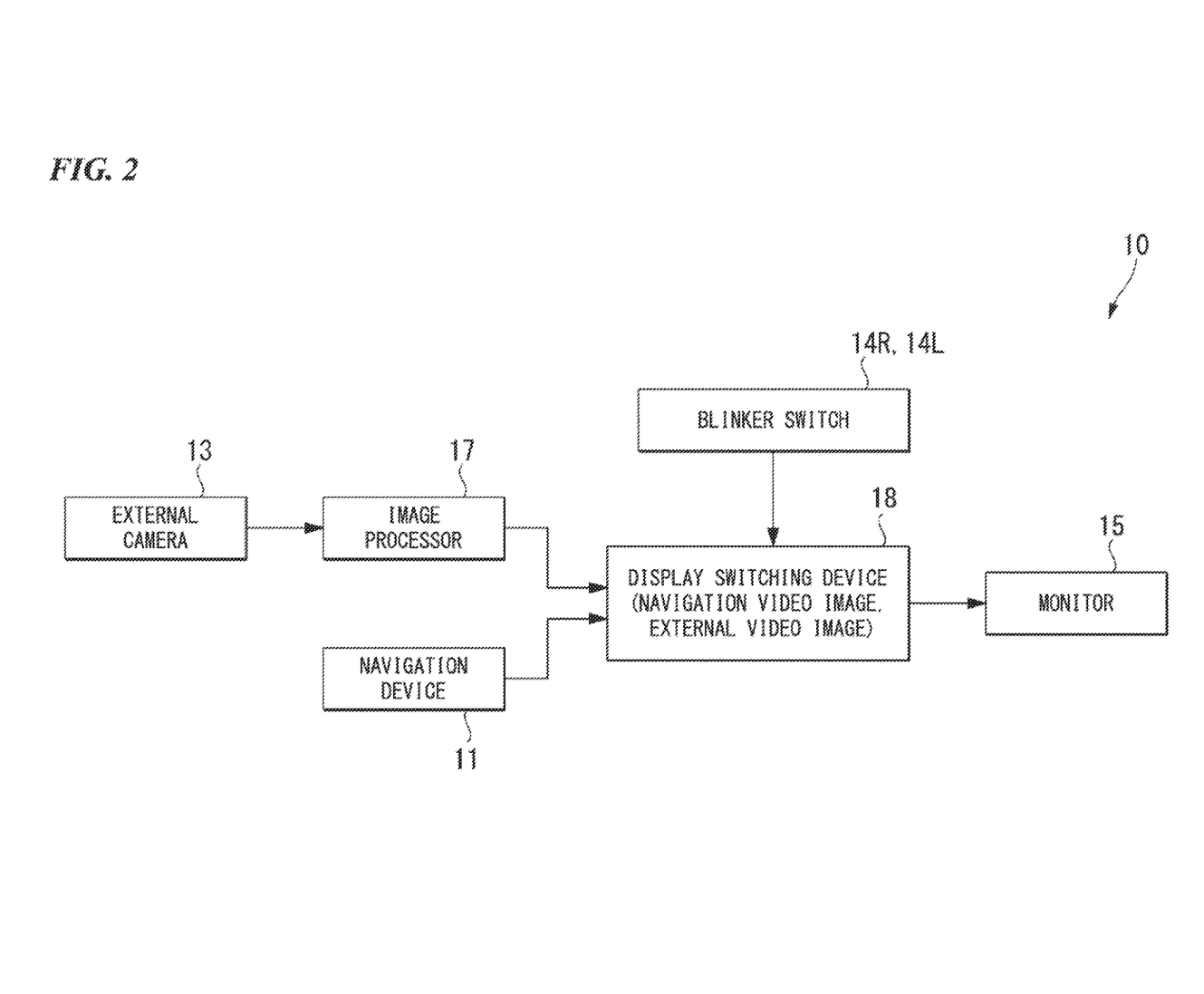
FIG. 2 is a block diagram showing the driving assistance device.

FIG. 1 is a configuration diagram of a driving assistance device, which is a front view seen from the interior of a vehicle. FIG. 2 is a block diagram showing the driving assistance device.

As described in FIGS. 1 and 2, a driving assistance device 10 according to the present embodiment includes a navigation device 11, an external camera (image capturing part) 13, blinker switches 14R and 14L, a monitor (display part) 15, side mirrors 16R and 16L, an image processor 17, and a display switching device (display part) 18.

The navigation device 11 receives a positioning signal such as a global positioning system (GPS) signal or the like, and detects a current position of a host vehicle based on the positioning signal. The GPS signal is a positional signal for measuring the position of the host vehicle using a satellite, for example. Further, the navigation device 11 can detect the current position of the host vehicle using computational processing of autonomous navigation based on the speed, the yaw rate and the like of the host vehicle.

Further, the navigation device 11 stores map data for displaying a map on a display screen such as a monitor 15, for example. The map data includes road coordinate data, and road data, for example.

The road coordinate data represents positional coordinates on a road necessary for map matching based on the current position of the host vehicle, for example. The road data represents data necessary for processes such as path finding, path guiding or the like, for example.

The road data mainly includes, nodes which are coordinate points configured by latitude and longitude of a predetermined position on a road such as an intersection point or a branching point, links which are lines connecting the respective nodes, road shapes, road types, road width data, and speed limits.

Further, for example, the navigation device 11 performs map matching for the map data based on information on the current position of the host vehicle and controls display of the map and the current position of the host vehicle on the monitor 15.

In addition, the navigation device 11 executes, for example, path finding, path guiding or the like and outputs, for example, the road data and navigation image data such as path guide information to a destination or a transit point to the display switching device 18.

The external camera 13 is configured by a CCD camera, a CMOS camera or the like capable of capturing an image at a visible light region, an infrared ray region or the like. In the present embodiment, the external camera 13 is disposed in a lower part of the left side mirror 16L (side mirror 16L provided on the side (passenger seat side) opposite to the driver seat side) among the right and left side mirrors 16R and 16L. The external camera 13 is disposed in the lower part of the side mirror 16L provided on the second side. The external camera 13 includes a wide-angle lens, and captures an external video image in a predetermined wide-angle area from the left lateral side to the rear side of the host vehicle. The external camera 13 performs predetermined image processing such as filtering or binarization, for example, for the captured video image to generate image data including pixels arranged two-dimensionally, and outputs the result to the image processor 17.

Figure 3:
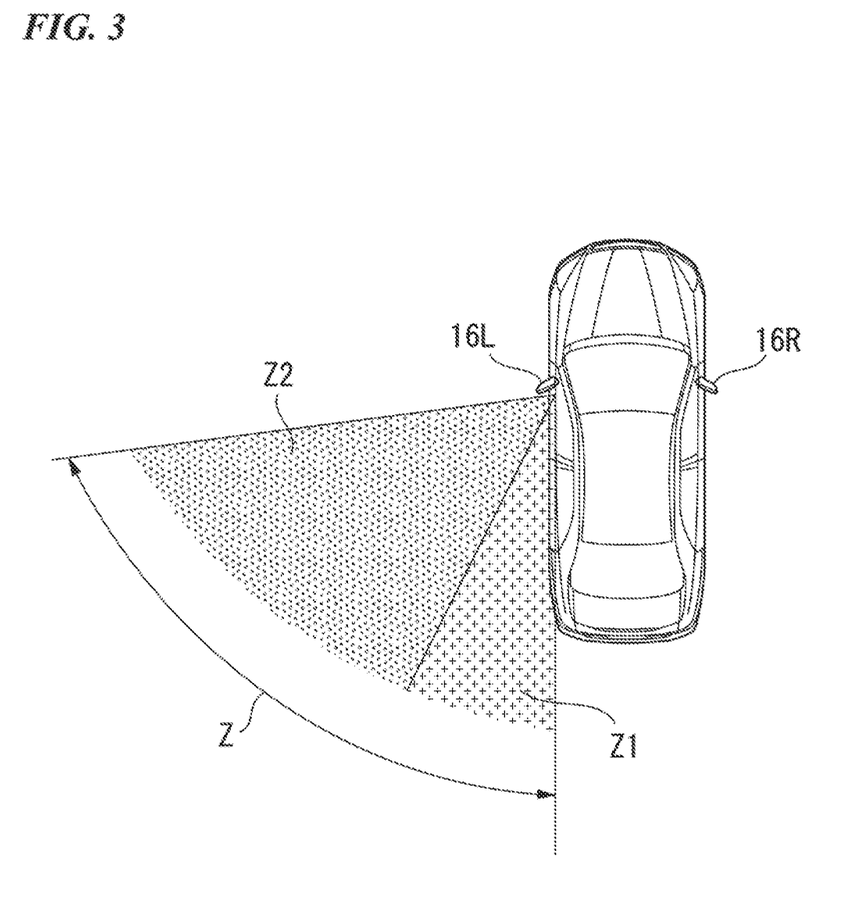
FIG. 3 is a diagram showing an example of a visual recognition range of a side mirror and a detection target area of an external camera in the driving assistance device.

As shown in FIG. 3, a detection target area Z of the external camera 13 includes a rear lateral area Z1 of the host vehicle that is a visual recognition range of the left side mirror 16L, and a dead angle area Z2 that is adjacent to the rear lateral area Z1 outside the visual recognition range of the left side mirror 16L. As shown in FIG. 3, the rear lateral area Z1 has, for example, a viewing angle of approximately 27° and the dead angle area Z2 has, for example, a viewing angle of approximately 82°. Further, among the detection target area of the external camera 13, an overlapping area with respect to the host vehicle is set to a viewing angle of approximately 1° to 2°.

As shown in FIGS. 1 and 2, the blinker switches 14R and 14L are configured by a lever switch that signals the movement of the host vehicle toward the first side or the second side to peripheral vehicles, for example. Specifically, the blinker switches 14R and 14L are switched to be turned on or off by tilting a blinker lever 21 disposed in front of a steering wheel 20 in a corresponding direction (anticlockwise or clockwise direction).

That is, when the left blinker switch 14L (second side blinker switch) among the right and the left blinker switches 14R and 14L is turned on (the blinker lever 21 is tilted anticlockwise), a left blinker lamp (not shown) flashes. On the other hand, when the right blinker switch 14R (first side blinker switch) is turned on (the blinker lever 21 is tilted clockwise), a right blinker lamp (not shown) flashes. Further, when the blinker switches 14R and 14L are turned off, that is, when the steering wheel 20 is returned by a predetermined steering angle or greater after lane change or after right or left turn, or when the blinker lever 21 is forcibly returned from a tilting position to a neutral position by a driver's operation, the flickering of the blinker lamp is finished.

The monitor 15 is configured by a liquid crystal display device of 5 to 8 inches, for example, provided in the navigation device 11. The monitor 15 is provided at a position (for example, approximately at the center of an instrument panel in the vehicle width direction) capable of being visually recognized by a driver.

The image processor 17 performs enlargement and compression for the image data input from the external camera 13, and outputs the image data after the image processing to the display switching device 18.

The display switching device 18 selectively switches whether to display a navigation image input from the navigation device 11 or an external video image input from the image processor 17 on the monitor 15. For example, the display switching device 18 determines whether the display of the external video image is necessary. If it is determined that the display of the external video image is not necessary, the display switching device 18 displays the navigation image on the monitor 15, and if it is determined that the display of the external video image is necessary, the display switching device 18 switches the navigation image to the external video image.

When it is detected that the above-described left blinker switch 14L (second side blinker switch) among the right and the left blinker switches 14R and 14L is turned on, the display switching device 18 predicts that the driver intends to execute lane change to a left lane or left turn, or detects that the host vehicle is actually executing the lane change or the left turn. In this case, the display switching device 18 determines that the display of the external video image is necessary, and displays the external video image on the monitor 15.

On the other hand, when it is detected that the left blinker switch 14L is turned off by the driver, the display switching device 18 determines that the display of the external video image is not necessary, and switches the video image on the monitor 15 to the navigation image after a predetermined amount of time (for example, about 2 seconds).

(Operation Method of Driving Assistance Device)

Figure 4:
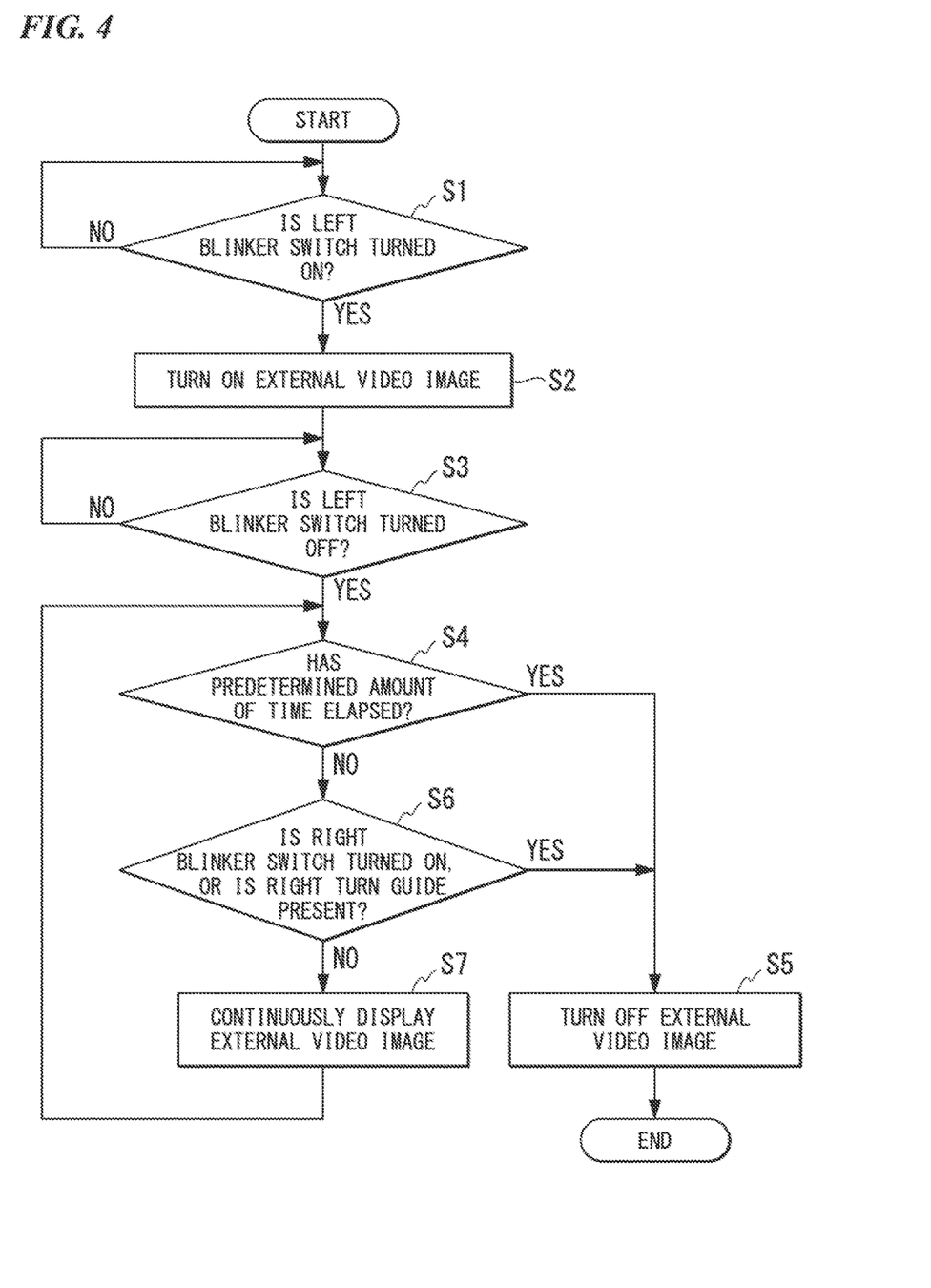
FIG. 4 is a flowchart showing an operation method of the driving assistance device.

Next, as an operation method of the above-described driving assistance device 10, a display switching method on the monitor 15 will be described. FIG. 4 is a flowchart showing the display switching method. In the following description, it is assumed that when the external video image is not displayed on the monitor 15, the navigation image is constantly displayed.

As shown in FIG. 4, in step S1, it is determined whether or not the left blinker switch 14L (second side blinker switch) is turned on.

If the determination result in step S1 is "NO" (if the left blinker switch 14L is not turned on), it is determined that the driver does not intend to execute the lane change to the left lane or the left turn, and the routine step S1 is repeated.

On the other hand, if the determination result in step S1 is "YES" (if the left blinker switch 14L is turned on), it is determined that the driver is actually executing the lane change to the left lane or the left turn, or the driver intends to execute the lane change to the left lane or the left turn, and the routine proceeds to step S2.

In step S2, the display switching device 18 displays the external video image input from the image processor 17 on the monitor 15. Thus, the driver can execute the lane change to the left lane or the left turn while confirming a situation reflected on the side mirror 16L and the external video image displayed on the monitor 15.

Next, in step S3, it is determined whether or not the left blinker switch 14L is turned off.

If the determination result in step S3 is "NO" (if the left blinker switch 14L is not turned off), it is determined that the left blinker switch 14L is still turned on, that is, the host vehicle is still changing the lane or is still turning left, and thus, the external video image is still necessary, and the routine step S3 is repeated.

On the other hand, if the determination result in step S3 is "YES" (if the left blinker switch 14L is turned off), the routine proceeds to step S4.

Then, in step S4, it is determined whether or not a predetermined amount of time (for example, about 2 seconds) elapses after the left blinker switch 14L is turned off.

If the determination result in step S4 is "YES" (if the predetermined amount of time elapses), it is determined that the external video signal is not necessary, and the routine proceeds to step S5 and the external video image is turned off. In this case, the display switching device 18 switches the video image displayed on the monitor 15 from the external video image to the navigation image. That is, after the predetermined amount of time elapses after the left blinker switch 14L is turned off, it is determined that the lane change or the left turn is completed, and the video image on the monitor 15 is returned to the navigation image.

On the other hand, if the determination result in step S4 is "NO" (if the predetermined amount of time does not elapse), it is determined that the lane change or the left turn is not yet completed with the left blinker switch 14L being turned off, and the routine proceeds to step S6.

Then, in step S6, it is determined whether or not the right blinker switch 14R (first side blinker switch) is turned on or whether or not a right turn path guide from the navigation device 11 is present. That is, it is determined whether or not the lane change to the right side or right turn is necessary before a predetermined amount of time elapses after the left blinker switch 14L is turned off based on the turn on of the right blinker switch 14R or the path guide from the navigation device 11.

If the determination result in step S6 is "NO", that is, if the turn on of the right blinker switch 14R or the path guide from the navigation device 11 is not present, the routine proceeds to step S7 to continue the display of the external video image. In this case, the routine returns to step S4 to repeat the above-described routine.

On the other hand, if the determination result in step S6 is "YES", that is, if the turn on of the right blinker switch 14R or the path guide from the navigation device 11 is present, the routine proceeds to step S5. In this case, the display of the external video image is turned off, and the video image displayed on the monitor 15 is switched to the navigation image.

Through the above-described processes, the present routine is finished.

In this way, in the present embodiment, when the left blinker switch 14L is turned off, the external video image is continuously displayed for the predetermined amount of time after the left blinker switch 14L is turned off.

According to this configuration, even when the left blinker switch 14L is turned off before the movement, such as lane change, of the host vehicle to the first side or to the second side is completed, it is possible to continuously confirm the external video image until the movement of the host vehicle to the first side or to the second side is completed. Further, when the lane change or the like is already completed at a time point when the left blinker switch 14L is turned off, it is possible to confirm a subsequent movement of the vehicle after the lane change or the like through the monitor 15.

Further, in the present embodiment, when the host vehicle turns right or changes to the right lane before the predetermined amount of time elapses after the left blinker switch 14L is turned off, the display of the external video image is turned off before the predetermined amount of time elapses.

According to this configuration, when the right turn or the like is performed before the predetermined amount of time elapses after the left blinker switch 14L is turned off, the image displayed on the monitor 15 can be switched to the navigation image from the external video image. Thus, after the lane change to the left lane or the left turn, it is possible to rapidly confirm the path guide.

Accordingly, it is possible to display an optimal image on the monitor 15 to enhance the convenience.

Particularly, in the present embodiment, it is determined whether or not the display of the external video image is continued based on the turn on of the right blinker switch 14R or the path guide from the navigation device 11. Thus, it is possible to reliably display the optimal image on the monitor 15.

The technical scope of the present invention is not limited to the above-described embodiment, and may include various modifications added thereto in a range without departing from the spirit of the present invention. That is, the configurations or the like shown in the above-described embodiment are merely examples, and may be appropriately modified.

For example, in the above-described embodiment, a case in which in the host vehicle in which the driver seat is disposed on the right side and the external camera 13 is attached to the left (passenger seat) side mirror 16L is described, but the invention is not limited thereto. In a vehicle in which a driver seat is disposed on a left side, the external camera 13 may be attached to the right side mirror 16R. That is, it is sufficient as long as the external camera 13 is attached to at least the side mirror opposite to the driver seat side, among the side mirrors 16R and 16L.

In the above-described embodiment, for example, it is assumed that the driver seat side is the first side (right side), and the passenger seat side is the second side (left side). However, the driver seat side may be the second side (left side), and the passenger seat side may be the first side (right side).

Further, in the above-described embodiment, it is determined whether or not the display of the external video image is to be turned off based on whether the right blinker switch 14R is turned on or whether or not the right turn path guide from the navigation device 11 is present, but the determination may be made by at least one method thereof.

Further, when the left blinker switch 14L is turned on again within a predetermined amount of time after the left blinker switch 14L is turned off, which one of the external video image and the navigation image is to be displayed may be appropriately changed in design.

In addition, various images such as an audio image, in addition to the external video image and the navigation image, may be selectively switched to be displayed on the monitor 15.

Furthermore, the blinker switches 14R and 14L are not limited to the lever switch, and may employ a touch switch or the like.

The display part is not limited to the above-described monitor 15, and may be configured by a display device that is integrated with meters that display various traveling states or is disposed in the vicinity of the meters, a head-up display that displays a variety of pieces of information at a position where the front visual field of the driver is not interrupted on the front window, or the like.

Further, the viewing angle of the external camera 13 may be appropriately changed in design as long as the rear lateral area of the host vehicle and the dead angle area outside the visual recognition range of the side mirror can be image-captured.

Next, a second embodiment of the present invention will be described with reference to the accompanying drawings. Hereinafter, different parts of the second embodiment with respect to the first embodiment will be mainly described, and common parts thereof will be briefly described or omitted. The same reference numerals are given to the same parts as in the first embodiment.

(Driving Assistance Device)

Figure 5:
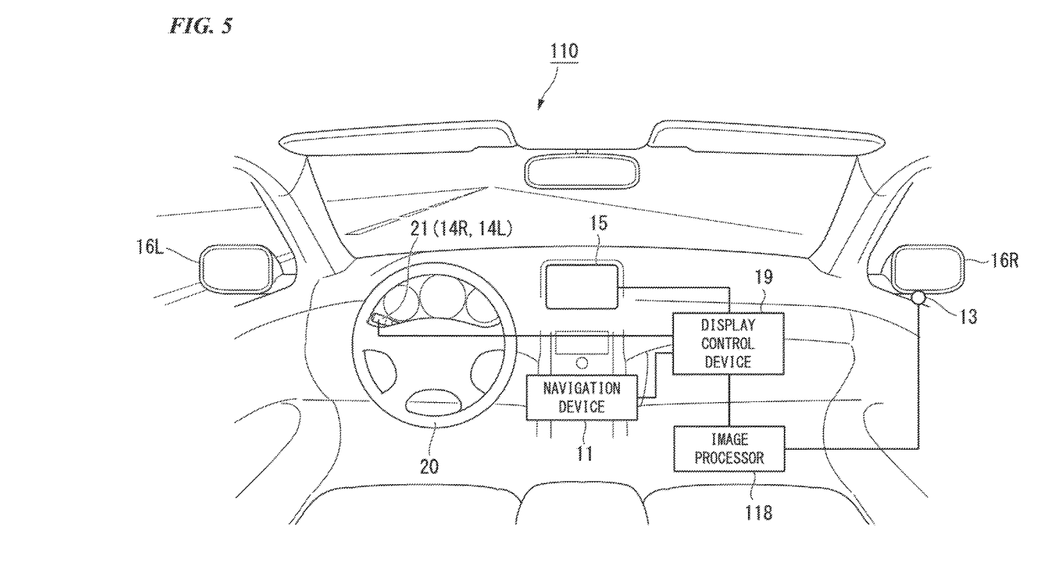
FIG. 5 is a configuration diagram showing a driving assistance device according to another embodiment of the invention, which is a front view seen from the interior of a vehicle.
Figure 6:
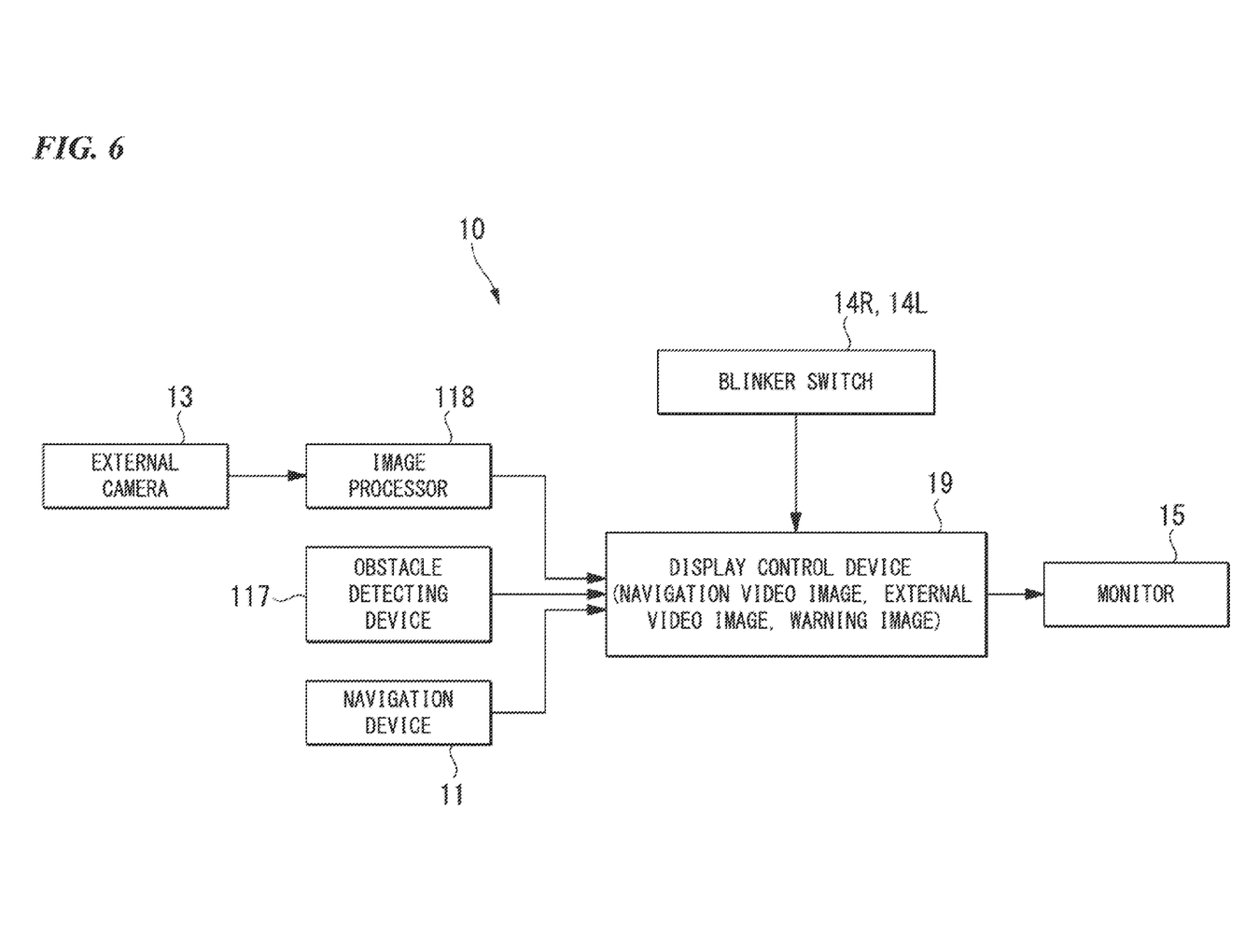
FIG. 6 is a block diagram showing the driving assistance device.

FIG. 5 is a configuration diagram showing a driving assistance device, which is a front view seen from the interior of a vehicle. FIG. 6 is a block diagram showing the driving assistance device.

As shown in FIGS. 5 and 6, a driving assistance device 110 according to the present embodiment includes a navigation device 11, an external camera (image capturing part) 13, blinker switches 14R and 14L, a monitor (display part) 15, side mirrors 16R and 16L, an obstacle detecting device 117, an image processor 118, and a display control device (display part) 19.

The navigation device 11 according to the present embodiment executes path finding, path guiding or the like, for example, and outputs road data and navigation image data such as path guide information to a destination or a transit point to the display control device 19.

The external camera 13 is configured by a CCD camera, a CMOS camera or the like capable of capturing an image at a visible light region, an infrared ray region or the like. In the present embodiment, the external camera 13 is disposed in a lower part of the right side mirror 16R (side mirror 16R provided on the side (passenger seat side) opposite to the driver seat side) among the right and the left side mirrors 16R and 16L. The external camera 13 is disposed in the lower part of the side mirror 16R provided on the second side. The external camera 13 includes a wide-angle lens, and captures an external video image in a predetermined wide-angle area from the right lateral side to the rear side of the host vehicle. The external camera 13 performs predetermined image processing such as filtering or binarization, for example, for the captured video image, to generate image data including pixels arranged two-dimensionally, and outputs the result to the image processor 118.

Figure 7:
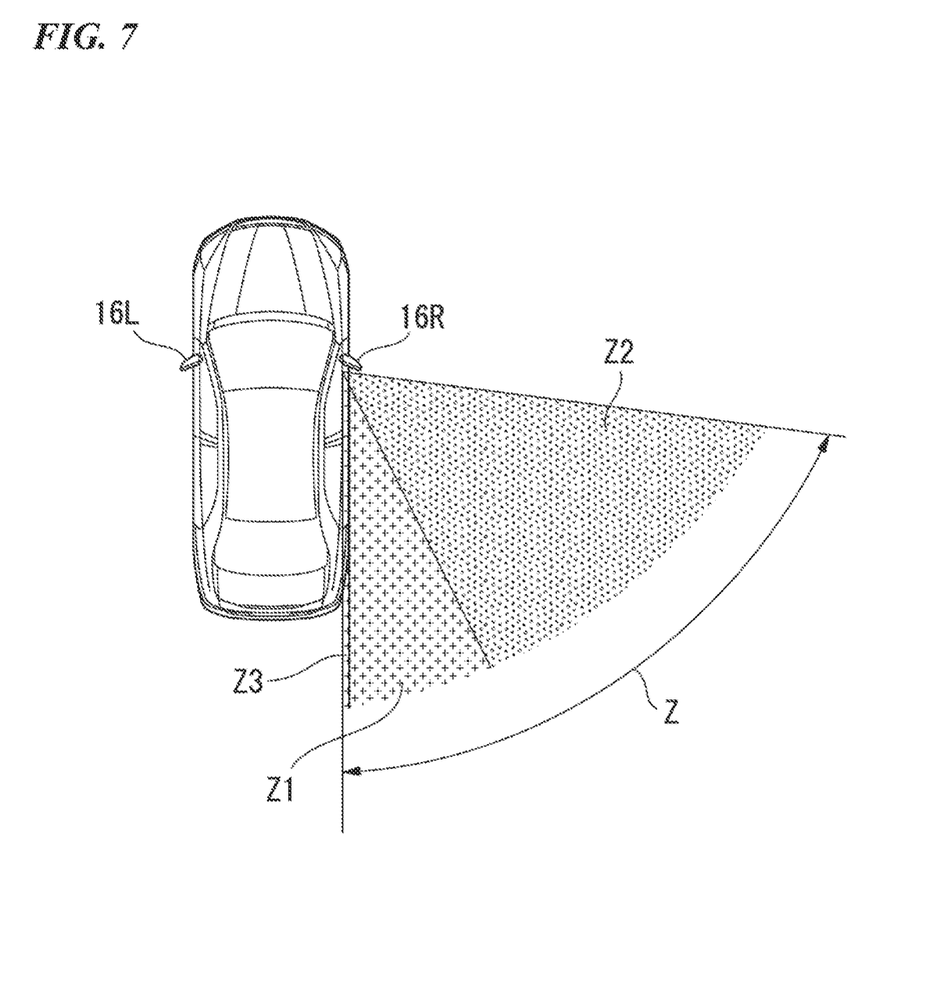
FIG. 7 is a diagram showing an example of a visual recognition range of a side mirror and a detection target area of an external camera in the driving assistance device.

As shown in FIG. 7, a detection target area Z of the external camera 13 includes a rear lateral area Z1 of the host vehicle that is a visual recognition range of the right side mirror 16R, and a dead angle area Z2 that is adjacent to the rear lateral area Z1 outside the visual recognition range of the right side mirror 16R. As shown in FIG. 7, the rear lateral area Z1 has, for example, a viewing angle of approximately 27° and the dead angle area Z2 has, for example, a viewing angle of approximately 82°. Further, among the detection target area Z of the external camera 13, an overlapping area Z3 with respect to the host vehicle is set to a viewing angle of approximately 1° to 2°.

As shown in FIGS. 5 and 6, the blinker switches 14R and 14L are configured by a lever switch that signals the movement of the host vehicle toward the first side or the second side to peripheral vehicles, for example. Specifically, the blinker switches 14R and 14L are switched to be turned on or off by tilting a blinker lever 21 disposed in front of a steering wheel 20.

That is, when the right blinker switch 14R (the second side blinker switch) is turned on (the blinker lever 21 is tilted clockwise) among the right blinker switch 14R and the left blinker switch 14L, a right blinker lamp (not shown) flashes. On the other hand, when the left blinker switch 14L (the first side blinker switch) is turned on (the blinker lever 21 is tilted anticlockwise), a left blinker lamp (not shown) flashes. Further, when the blinker switches 14R and 14L are turned off, that is, when the steering wheel 20 is returned by a predetermined steering angle or greater after lane change or after right or left turn, or when the blinker lever 21 is forcibly returned from a tilting position to an intermediate position by a driver's operation, the flickering of the blinker lamp is finished.

The obstacle detecting device 117 monitors the surroundings around the host vehicle, and detects whether or not an obstacle such as an adjacent vehicle, a pedestrian, or a structure is approaching the host vehicle. Specifically, the obstacle detecting device 117 detects the presence of the obstacle by a radar device (not shown) using an electromagnetic wave such as a millimeter wave or an image capturing device such as a CCD camera (for example, external camera 13). If the distance between the host vehicle and the obstacle is within a predetermined distance, the obstacle detecting device 117 determines that the host vehicle and the obstacle are approaching each other. Further, if it is determined that the host vehicle and the obstacle are approaching each other, the obstacle detecting device 117 outputs a warning signal toward the display control device 19.

The image processor 118 performs enlargement and compression for the image data input through the external camera 13, and outputs the image data after the image processing to the display control device 19.

The display control device 19 selectively switches whether to display a navigation image input from the navigation device 11 or an external video image input from the image processor 118 on the monitor 15. For example, the display control device 19 determines whether or not the display of the external video image is necessary. If it is determined that the display of the external video image is not necessary, the display control device 19 displays the navigation image on the monitor 15, and if it is determined that the display of the external video image is necessary, the display control device 19 switches the navigation image to the external video image.

Figure 8A:
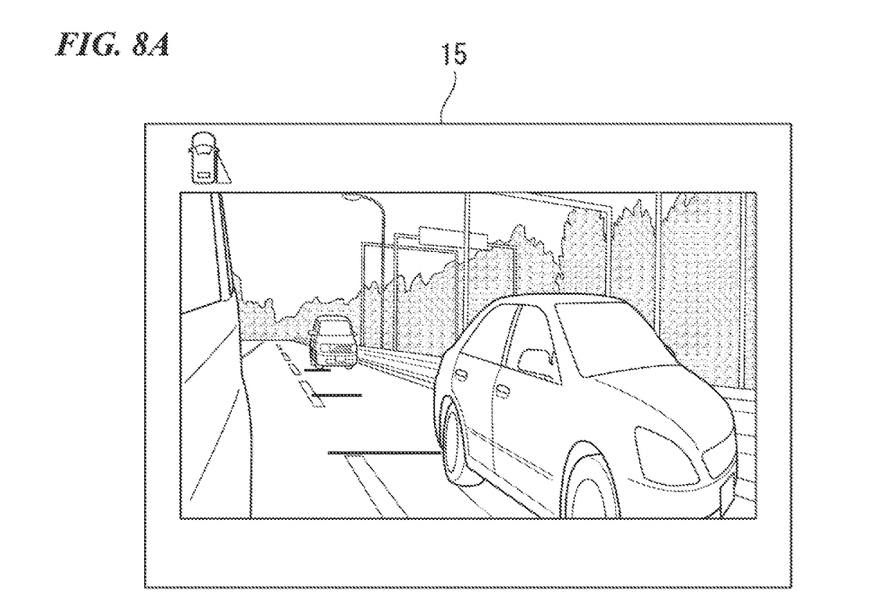
FIG. 8A is a diagram showing a state where a video image is displayed on a monitor during a normal display.
Figure 8B:
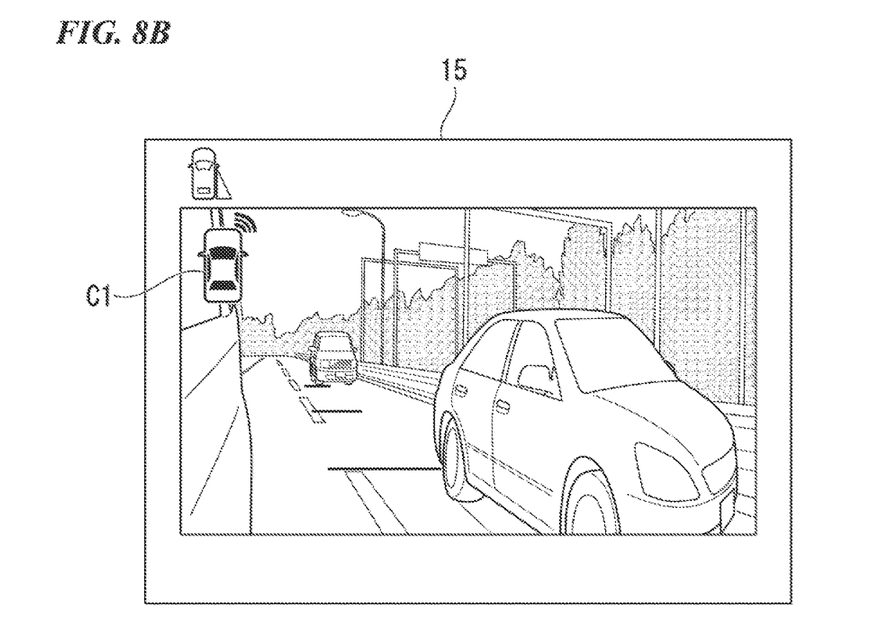
FIG. 8B is a diagram showing a state where a video image is displayed on a monitor during an overlap display of a first warning image.
Figure 9A:
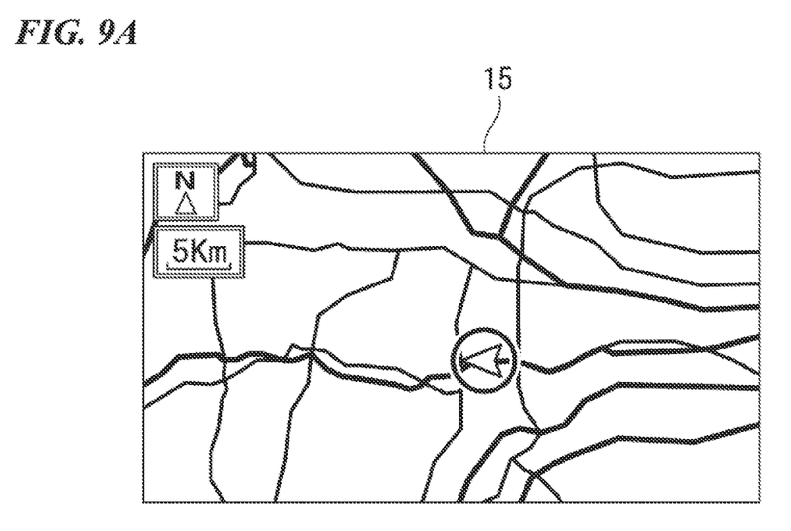
FIG. 9A is a diagram showing a state where a navigation image is displayed on a monitor during a normal display.
Figure 9B:
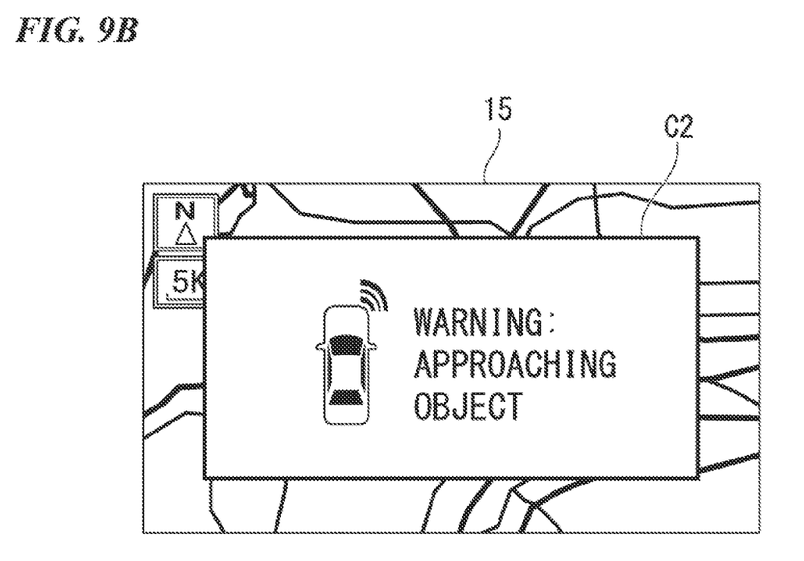
FIG. 9B is a diagram showing a state where a navigation image is displayed on a monitor during an overlap display of a second warning signal.

FIGS. 8A and 8B are diagrams showing a state where an external video image is displayed on a monitor. FIGS. 9A and 9B are diagrams showing a state where a navigation image (path guide image) is displayed on a monitor.

As shown in FIGS. 5, 6, 8A, and 8B, when the turn on of the right blinker switch 14R among the right and the left blinker switches 14R and blinker 14L is detected, the display control device 19 predicts that the driver intends to execute lane change to a right lane or right turn, or detects that the host vehicle is actually executing the lane change or the right turn. In this case, the display control device 19 determines that the display of the external video image is necessary, and displays the external video image (see FIG. 8A) on the monitor 15.

On the other hand, as shown in FIGS. 5, 6, 9A, and 9B, when it is detected that the right blinker switch 14R is turned off by the driver, the display control device 19 determines that the display of the external video image is not necessary, and displays the navigation image (see FIG. 9A) on the monitor 15.

Further, as shown in FIGS. 5, 6, 8A, 8B, 9A, and 9B, when the warning signal is input from the above-described obstacle detecting device 117, the display control device 19 displays a warning image on the monitor 15 to notify the driver of the approach of the obstacle.

The warning display is overlapped with the image (for example, external video image or navigation image) that is already displayed on the monitor 15. As shown in FIG. 8B, when the external video image is displayed on the monitor 15, a first warning image C1 smaller than a second warning image C2 to be described later is displayed. In the present embodiment, the first warning image C1 is displayed on the side of the host vehicle in the external video image displayed on the monitor 15, specifically, in the overlapped area Z3 (see FIG. 7) with respect to the host vehicle among the detection target area Z of the external camera 13.

Further, as shown in FIG. 9B, when the external video image is not displayed on the monitor 15 (for example, when the navigation image is displayed), the second warning image C2 larger than the first warning image C1 is overlapped with the navigation image. In the present embodiment, the second warning image C2 is set to a size spanning almost the entire monitor 15, including a central part of the monitor 15.

The above-described respective warning images C1 and C2 are formed so that attention calling is displayed in a direction where the obstacle is present with respect to the host vehicle. In the shown example, attention calling indicating that the obstacle is present on a right front side of the host vehicle is given. Further, the attention calling is made so that color, luminance, flickering or the like may be changed according to the distance between the host vehicle and the obstacle.

(Operation Method of Driving Assistance Device)

Figure 10:
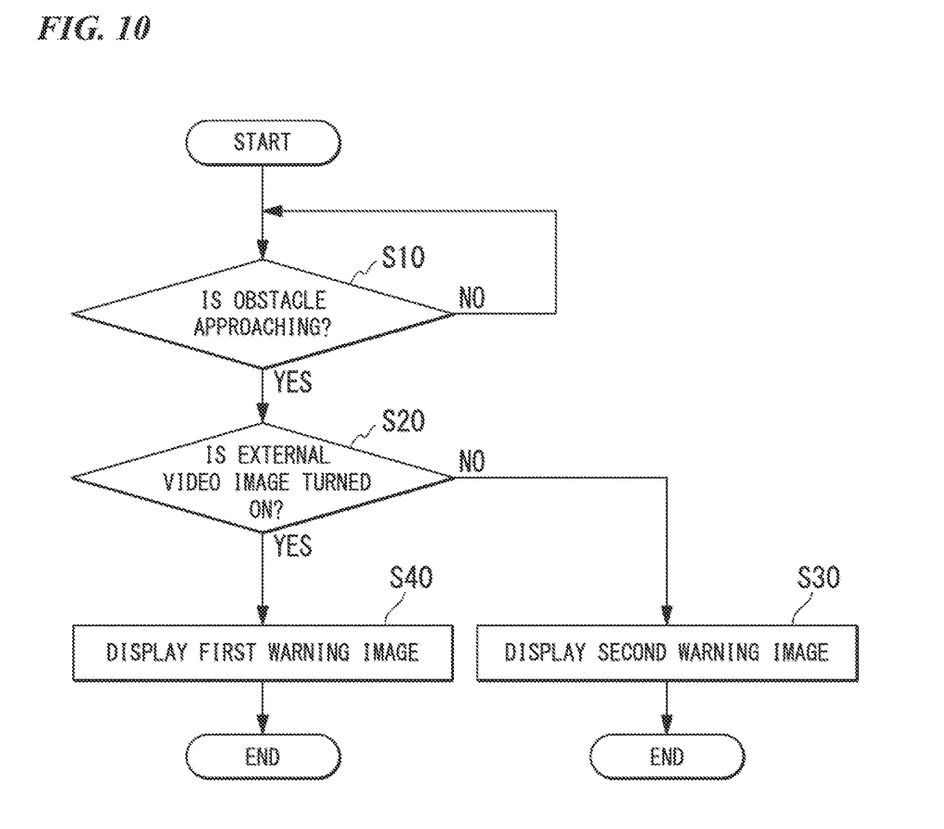
FIG. 10 is a flowchart showing an operation method of the driving assistance device.

Next, as an operation method of the above-described driving assistance device 110, a display control method on the monitor 15 will be described. FIG. 10 is a flowchart showing the display control method. In the following description, it is assumed that when the external video image is not displayed on the monitor 15, the navigation image shown in FIG. 9A is constantly displayed.

As shown in FIG. 10, in step S10, it is determined whether or not the host vehicle and the obstacle are approaching each other. Specifically, the obstacle detecting device 117 detects the presence of the obstacle by a radar device or an image capturing device, and determines whether the distance between the host vehicle and the obstacle is within a predetermined distance.

If the determination result in step S10 is "NO" (if the obstacle is not present or if the distance between the host vehicle and the obstacle is greater than the predetermined distance), it is determined that the warning for the driver is not necessary, and the routine step S10 is repeated.

On the other hand, if the determination result in step S10 is "YES" (if the obstacle is present in the vicinity of the host vehicle), it is determined that the warning for the driver is necessary, and the routine proceeds to step S20.

Then, in step S20, it is determined whether or not the external video image is displayed on the monitor 15. That is, it is determined whether or not the right blinker switch 14R is turned on.

If the determination result in step S20 is "NO" (if the external video image is not displayed on the monitor 15), it is determined that the navigation image is displayed on the monitor 15 as shown in FIG. 9A, and the routine proceeds to step S30.

Further, in step S30, as shown in FIG. 9B, the second warning image C2 is displayed on the monitor 15 on which the navigation image is displayed in an overlapping manner, and the routine is finished.

On the other hand, if the determination result in step S20 is "YES", it is determined that the external video image is displayed on the monitor 15 as shown in FIG. 8A, and the routine proceeds to step S40.

Further, in step S40, as shown in FIG. 8B, the first warning image C1 is displayed on the monitor 15 on which the external video image is displayed in an overlapping manner, and the routine is finished.

In this way, in the present embodiment, the first warning image C1 to be overlapped with the external video image is formed to be smaller than the second warning image C2 to be overlapped with the navigation image.

With this configuration, when the navigation image is displayed on the monitor 15, the second warning image C2 is displayed to become larger than the first warning image C1. Thus, the driver can reliably confirm the presence of the obstacle in the vicinity of the host vehicle.

On the other hand, when the external video image is displayed on the monitor 15, the first warning image C1 smaller than the second warning image C2 is displayed. Thus, the driver can recognize the presence of the obstacle in the vicinity of the host vehicle while confirming the external video image.

Accordingly, the warning image can be displayed in an optimal state according to the image already displayed on the monitor 15.

Further, since the second warning image C2 is formed to the size almost over the entire monitor 15, including the central part of the screen of the monitor 15, it is possible to reliably notify the driver of the presence of the obstacle in the vicinity of the host vehicle.

On the other hand, by overlapping the first warning image C1 with the host vehicle displayed on the external video image, it is possible to prevent the central part (effective part) of the screen of the external video image displayed on the monitor 15 from being covered with the first warning image C1. That is, the first warning image C1 is displayed at such a position so as not to be an obstacle when viewing the external video image. Thus, it is possible to notify the driver of the presence of the obstacle in the vicinity of the vehicle while securing visibility of the external video image. Accordingly, for example, when an obstacle is captured on the external video image, the first warning image C1 and the obstacle do not overlap each other on the monitor 15, to thus make it possible to recognize the obstacle through the monitor 15.

The technical scope of the invention is not limited to the above-described embodiment, and may include various modifications added thereto in a range without departing from the spirit of the present invention. That is, the configurations or the like shown in the above-described embodiment are merely examples, and may be appropriately modified.

For example, in the above-described embodiment, the external camera 13 is attached to the right (passenger seat side) side mirror 16R in the vehicle where the driver seat is disposed on the left side, but the invention is not limited thereto. In the vehicle where the driver seat is disposed on the right side, the external camera 13 may be attached to the left side mirror 16L. That is, the external camera 13 may be attached to at least a side mirror opposite to the driver seat side among the side mirrors 16R and 16L.

In the above-described embodiment, for example, the driver seat side is the first side (left side), and the passenger seat side is the second side (right side). However, the driver seat side may be the second side (right side), and the passenger seat side may be the first side (left side).

Further, as long as the first warning image C1 is smaller than the second warning image C2, the sizes, the display positions on the monitor 15, or the like of the warning images C1 and C2 can be appropriately changed.

Further, in the above-described embodiment, the configuration in which the navigation image and the external video image are selectively switched to be displayed is described, but a configuration in which a different image (for example, an audio image) is additionally displayed may be used.

In addition, a configuration in which the entire display of the monitor 15 can be turned off may be used. When the different image is displayed, or when the entire display is turned off, the same warning image as the second warning image C2 may be displayed. That is, when the external video image is not displayed, it is preferable to employ a configuration in which the same warning image as the second warning image C2 is displayed to reliably notify the driver of the presence of the obstacle in the vicinity of the host vehicle.

The sizes of the warning images may be made different from each other according to the image displayed on the monitor 15.

In addition, each warning image may be flashed, and a warning using sound may be performed in addition to the display of each warning image.

Furthermore, the detection of the obstacle using the obstacle detecting device 117 may be performed in any direction with respect to the host vehicle. For example, when the obstacle is detected on the rear lateral side of the host vehicle, it is possible to recognize the obstacle based on the external video image and the first warning image C1 displayed on the monitor 15. When the obstacle is detected on the front lateral side of the host vehicle, it is possible to recognize the obstacle on the front lateral side of the host vehicle by the first warning image C1 while confirming the rear lateral side of the host vehicle by the external video image.

Also, when the obstacle is present on the rear lateral side, the first warning image C1 may be displayed to be overlapped with the host vehicle displayed on the external video image, and when the obstacle is present on the front lateral side and the obstacle is not present on the rear lateral side, the first warning image C1 may be displayed close to the central part or may be enlarged compared with the case where the obstacle is present on the rear lateral side. In this case, when the obstacle is present only on the front lateral side, it is possible to reliably recognize the presence or the absence of the obstacle.

Further, the blinker switches 14R and 14L are not limited to the lever switch, and may employ a touch switch or the like. In addition, in the above-described embodiment, a configuration in which the turning on and turning off of the external video image is switched according to the switching of the turning on and turning off of the blinker switches 14R and 14L is described. However, the invention is not limited thereto, and the turning on and turning off of the external video image may be manually switched.

In addition, the display part is not limited to the above-described monitor 15, and may be configured by a display device that is integrated with meters that display various traveling states or are disposed in the vicinity of the meters, a head-up display that displays a variety of pieces of information at a position where the front visual field of the driver is not interrupted on the front window, or the like.

Further, the viewing angle of the external camera 13 may be appropriately changed in design as long as the rear lateral area of the host vehicle and the dead angle area outside the visual recognition range of the side mirror can be image-captured.

The above-described embodiments may be appropriately combined. In addition, some of the components may be omitted.

REFERENCE SIGNS LIST 10, 110: DRIVING ASSISTANCE DEVICE
11: NAVIGATION DEVICE
13: EXTERNAL CAMERA (IMAGE CAPTURING PART)
14L: LEFT BLINKER SWITCH (FIRST SIDE BLINKER SWITCH SECOND SIDE BLINKER SWITCH)
14R: RIGHT BLINKER SWITCH (FIRST SIDE BLINKER SWITCH, SECOND SIDE BLINKER SWITCH)
15: MONITOR (DISPLAY PART)
16L: LEFT SIDE MIRROR (SIDE MIRROR)
16R: RIGHT SIDE MIRROR
18: DISPLAY SWITCHING DEVICE (DISPLAY PART)
19: DISPLAY CONTROL DEVICE (DISPLAY PART)
117: OBSTACLE DETECTING DEVICE
118: IMAGE PROCESSOR
Z1: REAR LATERAL AREA
Z2: DEAD ANGLE AREA
C1: FIRST WARNING IMAGE (WARNING IMAGE)
C2: SECOND WARNING IMAGE (WARNING IMAGE)

The invention claimed is:

1. A driving assistance device comprising:
an image capturing part that is provided, when it is assumed that a driver seat side in a vehicle width direction of a vehicle is a first side and a side opposite to the first side is a second side, on a side mirror on the second side of the vehicle, and is configured to image-capture a rear lateral area of the vehicle and a dead angle area which is adjacent to the rear lateral area outside a visual recognition range of the side mirror on the second side;

a display part configured to display a video image captured by the image capturing part to be visually recognized by a driver of the vehicle; and a blinker switch configured to make a signal of a movement of the vehicle to the first side or the second side, wherein the display part displays the video image according to a turn on of the blinker switch indicating a movement of the vehicle to the second side, turns off the display of the video image when a predetermined amount of time elapses after the blinker switch is turned off, and turns off the display of the video image before the predetermined amount of time elapses and displays navigation image data of the vehicle when it is predicted that the vehicle moves to the first side within the predetermined amount of time, and wherein the display part turns off the display of the video image before the predetermined amount of time elapses when it is predicted that the vehicle moves to the first side within the predetermined amount of time after the blinker switch indicating the movement of the vehicle to the second side is turned off, based on path guide information from a navigation device, the path guide information including route information to a destination or a transit point of the vehicle.

2. The driving assistance device according to claim 1, wherein the display part displays a warning image for performing a warning to a driver when an obstacle is present in the vicinity of the vehicle, and when the video image is displayed on the display part, the warning image, which has a size smaller than a size of the warning image when the video image is not displayed on the display part, is displayed in an overlapping manner with the video image.

3. The driving assistance device according to claim 2, wherein the warning image displayed on the display when the video image is not displayed on the display part is displayed at a position including a central part of a screen on the display part, and the warning image displayed on the display when the video image is displayed on the display part is displayed at a position that overlaps with the vehicle on the video image displayed on the display part.

* * * * *